United States Patent
Jang et al.

(10) Patent No.: US 9,878,622 B2
(45) Date of Patent: Jan. 30, 2018

(54) POWER SUPPLY APPARATUS FOR ECO-FRIENDLY VEHICLE

(71) Applicant: Hyundai Motor Company, Seoul (KR)

(72) Inventors: Hui Sung Jang, Gyeonggi-do (KR);
Hyun Wook Seong, Gyeonggi-do (KR);
Shin Hye Chun, Jeollanam-do (KR);
Mu Shin Kwak, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 213 days.

(21) Appl. No.: 14/876,234

(22) Filed: Oct. 6, 2015

(65) Prior Publication Data
US 2016/0311332 A1  Oct. 27, 2016

(30) Foreign Application Priority Data
Apr. 23, 2015 (KR) .......................... 10-2015-0057291

(51) Int. Cl.
| | |
|---|---|
| *B60L 3/00* | (2006.01) |
| *B60L 1/00* | (2006.01) |
| *H02J 3/00* | (2006.01) |
| *B60L 11/18* | (2006.01) |
| *H02M 3/158* | (2006.01) |

(52) U.S. Cl.
CPC ......... *B60L 11/1811* (2013.01); *H02M 3/158* (2013.01); *Y02T 10/7258* (2013.01)

(58) Field of Classification Search
CPC .............................. B60L 11/1811; H02M 3/158
USPC ....................................................... 307/10.1
See application file for complete search history.

(56) References Cited

U.S. PATENT DOCUMENTS

| | | | |
|---|---|---|---|
| 2013/0020863 A1* | 1/2013 | Sugiyama | ............ B60L 11/1803 307/9.1 |
| 2013/0271077 A1 | 10/2013 | Kim et al. | |
| 2017/0057376 A1* | 3/2017 | Murata | ............... H01M 10/486 |

FOREIGN PATENT DOCUMENTS

| | | |
|---|---|---|
| JP | 2008-079436 A | 4/2008 |
| KR | 10-2003-0050139 A | 6/2003 |
| KR | 10-0964016 B1 | 6/2010 |
| KR | 2012-0114852 A | 10/2012 |
| KR | 10-1387717 B1 | 4/2014 |
| KR | 2014-0084369 A | 7/2014 |

* cited by examiner

*Primary Examiner* — Rexford Barnie
*Assistant Examiner* — Toan Vu
(74) *Attorney, Agent, or Firm* — Mintz Levin Cohn Ferris Glovsky and Popeo, P.C.; Peter F. Corless

(57) ABSTRACT

A power supply apparatus of an eco-friendly vehicle is provided. The power supply apparatus includes a battery that is configured to supply electric power for driving a vehicle and an inverter that is configured to drive a motor of the vehicle. A power converter is configured to correct a power factor of AC power applied from exterior, or to supply power of the battery to the inverter. A DC converter is configured to convert a power output from the power converter to a charging power for charging the battery. A first relay is configured to turn a power transmission between the battery and the power converter on/off and a second relay is configured to turn the power transmission between the battery and the power converter on/off.

11 Claims, 5 Drawing Sheets

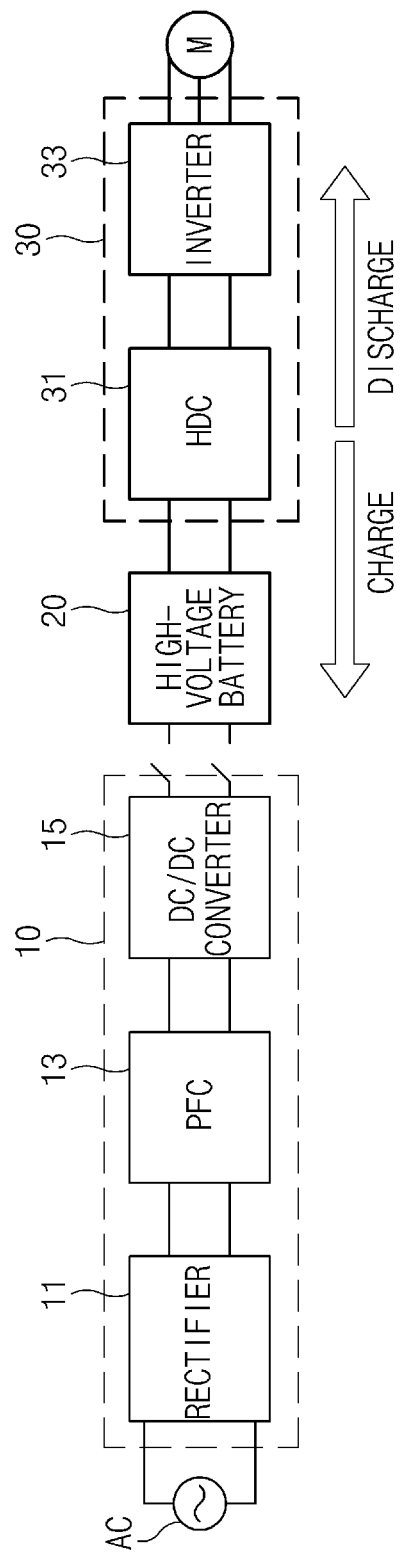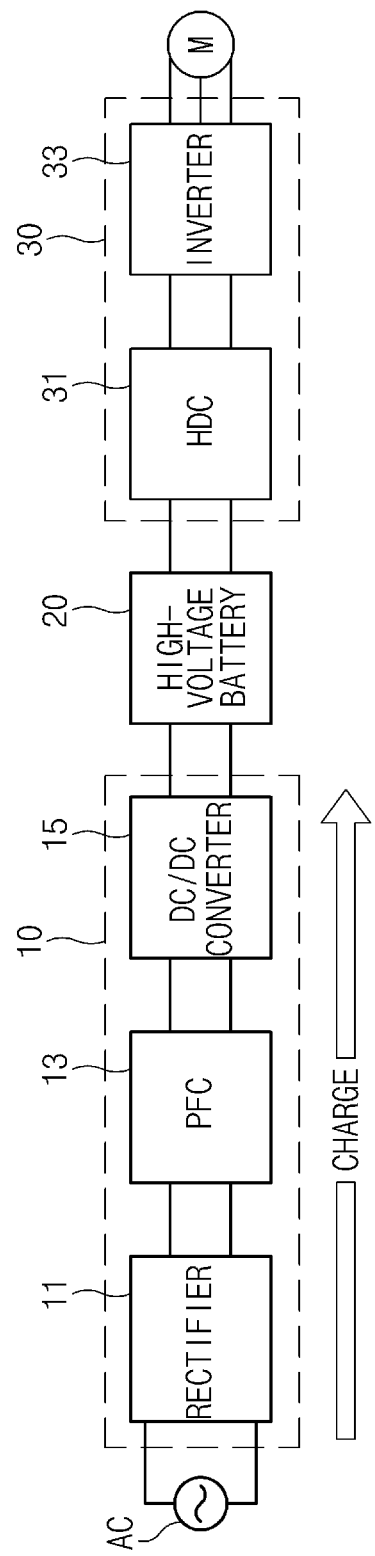

POWER SUPPLY APPARATUS FOR ECO-FRIENDLY VEHICLE

CROSS-REFERENCE TO RELATED APPLICATION

This application claims the benefit of priority to Korean Patent Application No. 10-2015-0057291, filed on Apr. 23, 2015 in the Korean Intellectual Property Office, the disclosure of which is incorporated herein in its entirety by reference.

BACKGROUND (a) Field of the Disclosure

The present disclosure relates to a power supply apparatus of an eco-friendly vehicle which reduces cost and reduces weight and volume of a vehicle by integrating a power converter for charging a battery and a power converter for driving a motor.

(b) Description of the Related Art

An eco-friendly vehicle includes various types of vehicles such as a hybrid vehicle, a plug-in hybrid vehicle, an electric vehicle, a fuel cell vehicle, and the like. Among them, the plug-in hybrid vehicle and the electric vehicle are equipped with an on-board battery charger (OBC) configured to charge a battery using a household power supply. In addition, the eco-friendly vehicle includes a high voltage converter (HDC) disposed between a high-voltage battery and an inverter to increase power transmission efficiency during motor driving and regenerative braking.

Referring to FIGS. 1A and 1B, a conventional on-vehicle OBC 10 according to the related art includes a rectifier 11 configured to receive and rectify commercial electricity (AC), a power factor correction (PFC) 13 which is an alternating current/direct current (AC/DC) converter, and an isolated DC/DC converter 15. In particular, a step-up converter is used as the PFC. The OBC 10 is configured to charge a high voltage battery 20 using the commercial electricity (AC).

A power conversion device 30 mounted in the eco-friendly vehicle includes a HDC 31 and an inverter 33. The HDC 31 increases the power output from the high-voltage battery 20 and transmits to the inverter 33, and a three-phase alternating-current power converted by the inverter 33 drives a motor (M). In addition, during the regenerative braking of a vehicle, the HDC 31 decreases the power received via the motor (M) and the inverter 33. Thus, the HDC 31 is implemented by a bidirectional converter. During driving of the motor (M) or regenerative braking, a discharging or charging of the high voltage battery 20 is accomplished by the HDC 31 and the inverter 33. Meanwhile, the charging of the high voltage battery by commercial electricity is accomplished by the rectifier 11 of the OBC 10, the PFC 13, and the DC/DC converter 15.

As described above, in the related art, although the PFC which is a power converter for charging a battery and the HDC which is a power converter for driving a motor have a similar topology, there is a difference in the role and the control method, such that they are configured separately. Thus, in the related art, since the power converter is configured based on use, the number of power converters mounted within the vehicle is increased to increase cost. In addition, in the related art, as a power device, such as inductor and capacitor, which occupies most of the weight and volume of the power converter is increased to increase the weight and volume of the vehicle, thereby reducing fuel consumption.

SUMMARY

The present disclosure provides a power supply apparatus of an eco-friendly vehicle which reduces cost and reduces weight and volume of a vehicle by integrating a power converter for charging a battery and a power converter for driving a motor.

In accordance with an aspect of the present disclosure, a power supply apparatus of an eco-friendly vehicle may include: a battery configured to supply electric power for driving a vehicle; an inverter configured to drive a motor of the vehicle; a power converter configured to correct a power factor of alternating current (AC) power applied from exterior, or to supply power of the battery to the inverter; a direct current (DC) converter configured to convert a power output from the power converter to a charging power for charging the battery; a first relay configured to turn a power transmission between the battery and the power converter on/off; and a second relay configured to turn the power transmission between the battery and the power converter on/off.

In particular, the first relay may be turned on, and the second relay may be turned off, when a mode of the vehicle is a driving mode. The DC converter may be implemented by an insulated DC/DC converter. Further, the power converter may be configured to convert a regenerative power generated by the motor during braking of the motor into the charging power to charge the battery. The first relay may be turned off, and the second relay may be turned on, when charging the battery by using the AC power.

The power supply apparatus may further include a rectifier configured to rectify the AC power. The power converter may be configured to increase or decrease the power input using the rectifier to transmit to the DC converter. The power converter may include: an inductor having a first end connected to an output end of the rectifier; a first switch having a first end connected to a second end of the inductor; a second switch having a first end connected to a second end of the inductor; and a capacitor having a first end connected to a second end of the first switch and having a second end connected to the second end of the second switch. The first switch and the second switch may operate complementarily. Additionally, the first switch and the second switch may be implemented by an insulated gate bipolar mode transistor (IGBT).

BRIEF DESCRIPTION OF THE DRAWINGS

The objects, features and advantages of the present disclosure will be more apparent from the following detailed description in conjunction with the accompanying drawings, in which:

FIGS. 1A-1B are diagrams illustrating a topology of a charger and a power converter of an eco-friendly vehicle according to the related art;

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 2:
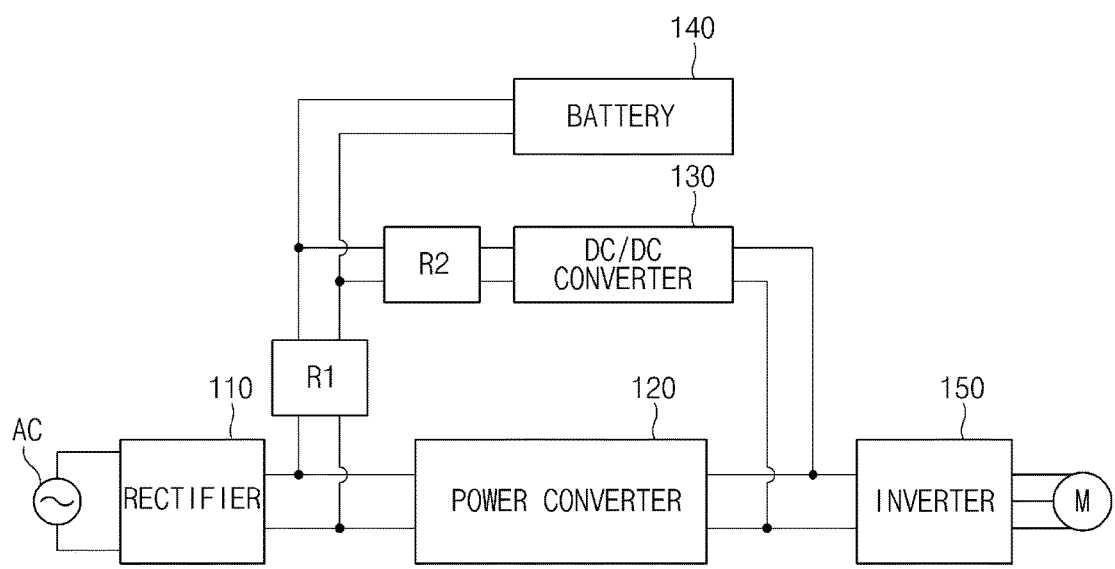
FIG. 2 is a block diagram illustrating a power supply apparatus of an eco-friendly vehicle according to an exemplary embodiment of the present disclosure.
Figure 3:
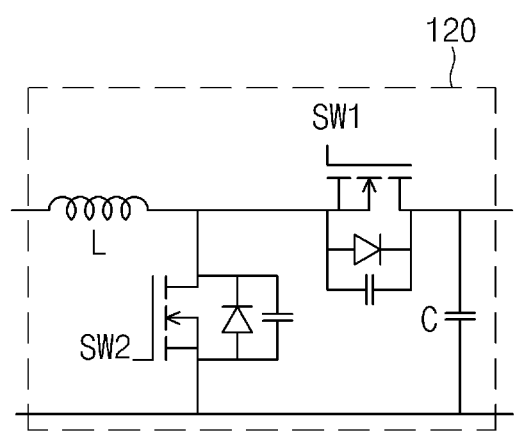
FIG. 3 is a circuit diagram of an integrated power converter shown in FIG. 2 according to an exemplary embodiment of the present disclosure.

FIG. 2 is a block diagram illustrating a power supply apparatus of an eco-friendly vehicle according to an exemplary embodiment of the present disclosure, and FIG. 3 is a circuit diagram of a power converter shown in FIG. 2. As shown in FIG. 2, the power supply apparatus of an eco-friendly vehicle may include a rectifier 110, a power converter 120, a DC converter 130, a battery 140, an inverter 150, a first relay R1, and a second relay R2.

Particularly, the rectifier 110 may be configured to rectify alternating current (AC) applied from the exterior. In other words, the rectifier 110 may be configured to convert the alternating current to direct current (DC). The power converter 120 may be configured to increase or decrease the AC (AC power) output from the rectifier 110. Additionally, the power converter 120 may be configured to correct power factor of an output voltage rectified by the rectifier 110. In the present exemplary embodiment, although it is disclosed that the separately provided rectifier 110 rectifies the AC power applied from the exterior, it is not limited thereto, and the power converter 120 may be implemented to rectify the AC power applied from the exterior.

Further, the power converter 120 may be configured to convert a regenerative power which is generated by the motor (M) while braking the vehicle into a charging voltage required for charging the battery 140, and transmit the charging voltage to the battery 140. In other words, when the regenerative power is transmitted to the power converter 120 via the inverter 150, the power converter 120 may be configured to convert the regenerative power to a charging voltage. The power converter 120 may then be configured to increase the power supplied from the battery 140 and supply the power to the inverter 150 during the driving of the vehicle. The power converter 120 may be implemented by a bi-directional converter.

As shown in FIG. 3, the power converter 120 may include an inductor (L), a capacitor (C), a first switch (SW1) and a second switch (SW2). The first switch (SW1) and the second switch (SW2) may be implemented by an insulated gate bipolar mode transistor (IGBT). The first switch (SW1) and the second switch (SW2) may operate complementarily under the control of a vehicle controller (not shown). The vehicle controller (not shown) may be configured to operate the first switch (SW1) and the second switch (SW2) by a pulse width modulation (PWM) method. The DC converter 130 may be configured to convert the power output from the power converter 120 to the charging voltage (the voltage required to charge) for charging the battery 140. The DC converter 130 may be implemented by an isolated DC/DC converter.

The battery 140 may be a high-voltage battery, and may be configured to supply the power required for the driving of the vehicle. The battery 140 may be charged by the power supplied by the power converter 120. The battery 140 may include a battery management system (BMS) configured to monitor the level and status of the battery in real-time to prevent over-charging or over-discharging, or the like. The inverter 150 may be configured to convert the DC power output from the power converter 120 to a three-phase AC power required for driving the motor (M). The motor (M) may then be configured to convert an electrical energy supplied by the inverter 150 to a driving energy to drive the vehicle. In addition, the motor (M) may be configured to generate a regenerative power while braking the vehicle.

The first relay (R1) and the second relay (R2) may form a power transmission path based on the operation mode of the vehicle under the control of the vehicle controller (not shown). Particularly, the operation mode of the vehicle may be divided into a driving mode and a charging mode. When the operation mode of the vehicle is the driving mode, the first relay (R1) may be turned on (ON), the second relay (R2) may be turned off (OFF). Further, when the operation mode of the vehicle is the charging mode, the first relay (R1) may be turned off, and the second relay (R2) may be turned on.

Figure 4:
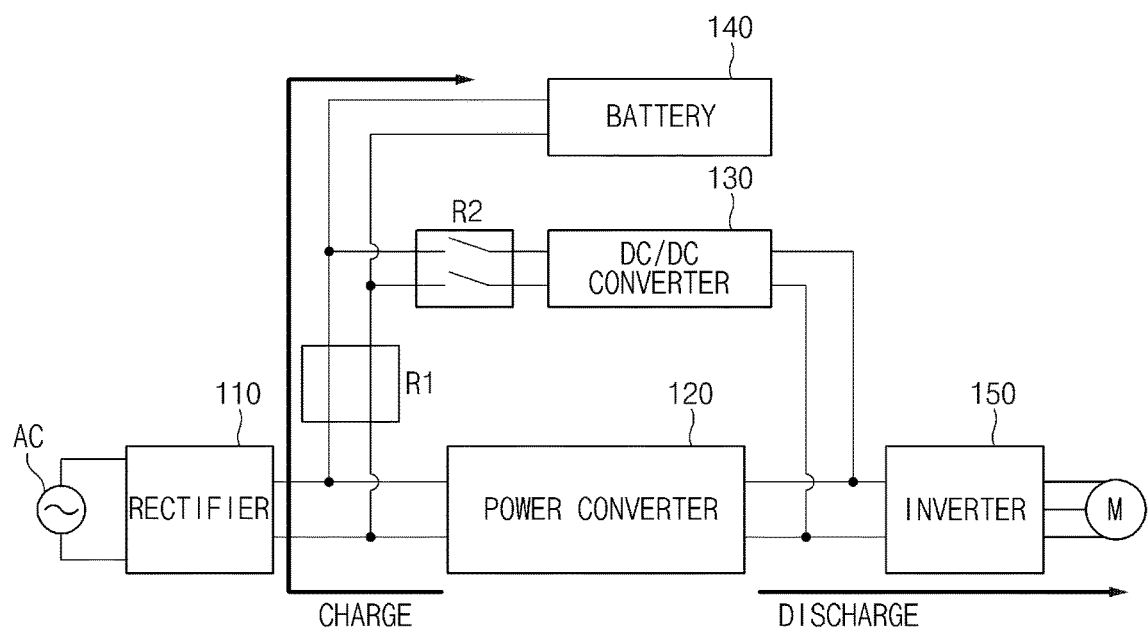
FIG. 4 is a diagram illustrating an operation of a power supply apparatus in a vehicle driving mode according to an exemplary embodiment of the present disclosure.

FIG. 4 is a diagram illustrating an operation of a power supply apparatus which may be executed by the vehicle controller in a vehicle driving mode according to an exemplary embodiment of the present disclosure. First, when the operation mode of the vehicle is the driving mode, the first relay (R1) may be turned on (ON), the second relay (R2) may be turned off (OFF). When the first relay (R1) is turned on (ON), and the second relay (R2) is turned off (OFF), the power supply apparatus may be configured to discharge or charge the battery 140 via the power converter 120 and the inverter 150 based on the operation mode of the motor (M).

The power supply apparatus may be configured to perform a pulse width modulation (PWM) control of the first switch (SW1) and the second switch (SW2) of the power converter 120 to supply the power output from the battery 140 to the motor (M) via the power converter 120 and the inverter 150 when driving the motor (M). Accordingly, the first switch (SW1) and the second switch (SW2) may operate complementarily. The power converter 120 may be configured to convert the power supplied from the battery 140 to a driving power for driving the motor (M). In addition, the inverter 150 may be configured to convert the converted driving power to a three-phase AC power to transmit to the motor (M).

Furthermore, the power supply apparatus may be configured to operate the first switch (SW1) and the second switch (SW2) of the power converter 120 complementarily when braking the motor (M), so that the regenerative power generated while braking the motor (M) is transmitted to the battery 140 via the inverter 150 and the power converter 120. In particular, the battery 140 may be charged by the regenerative power.

Figure 5:
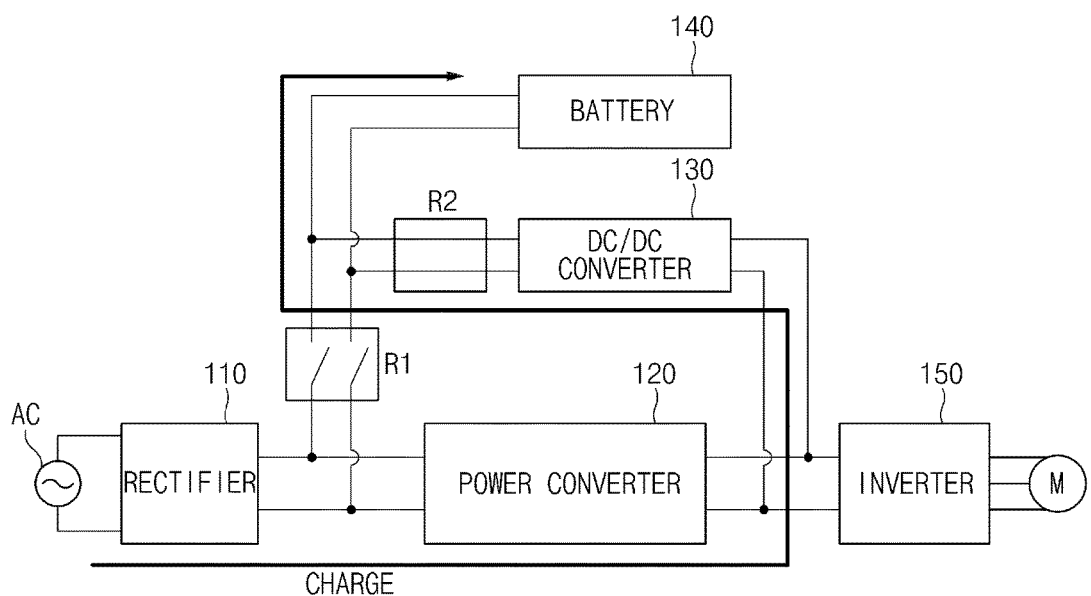
FIG. 5 is a diagram illustrating an operation of a power supply apparatus in a vehicle charging mode according to an exemplary embodiment of the present disclosure.

FIG. 5 is a diagram illustrating an operation of a power supply apparatus in a vehicle charging mode according to an exemplary embodiment of the present disclosure. When operation mode of the vehicle is the charging mode, the first relay (R1) may be turned off, and the second relay (R2) may be turned on, so that a power transmission path may be formed. Then, the power supply apparatus may be configured to operate the first switch (SW1) and the second switch (SW2) of the power converter 120 complementarily.

When the first relay (R1) is turned off, and the second relay (R2) is turned on, the rectifier 110 may be configured to rectify the input AC power (AC), and the power converter 120 may be configured to increase or decrease the rectified power to correct the power factor. The DC converter 130 may be configured to convert the power factor corrected power to the charging power to charge the battery 140.

The present disclosure allows the cost and the weight and volume of the vehicle to be reduced by integrating the power converter for charging a battery and the power converter for driving a motor. Thus, the power supply apparatus according to the present disclosure may enhance the fuel efficiency of the vehicle.

Although exemplary embodiments of the present disclosure have been described in detail hereinabove, it should be clearly understood that many variations and modifications of the basic inventive concepts herein taught which may appear to those skilled in the present art will still fall within the spirit and scope of the present disclosure, as defined in the appended claims.

What is claimed is:

1. A power supply apparatus of an eco-friendly vehicle, comprising:
   a battery configured to supply electric power for driving a vehicle;
   an inverter configured to drive a motor of the vehicle;
   a power converter configured to correct a power factor of alternating current (AC) power applied from exterior, or to supply power of the battery to the inverter;
   a direct current (DC) converter configured to convert a power output from the power converter to a charging power for charging the battery;
   a first relay configured to turn a power transmission between the battery and the power converter; and
   a second relay configured to turn the power transmission between the battery and the DC converter,
   wherein the first relay is turned on, and the second relay is turned off, when a mode of the vehicle is a driving mode, and
   wherein the first relay is turned off, and the second relay is turned on, when charging the battery using the AC power.

2. The power supply apparatus of claim 1, wherein the DC converter is implemented by an insulated DC/DC converter.

3. The power supply apparatus of claim 1, wherein the power converter is configured to convert a regenerative power generated by the motor during braking of the motor into the charging power to charge the battery.

4. The power supply apparatus of claim 1, further comprising:
   a rectifier configured to rectify the AC power.

5. The power supply apparatus of claim 4, wherein the power converter is configured to increase or decrease the power input via the rectifier to transmit to the DC converter.

6. The power supply apparatus of claim 4, wherein the power converter comprises:
   an inductor having a first end connected to an output end of the rectifier;
   a first switch having a first end connected to a second end of the inductor;
   a second switch having a first end connected to the second end of the inductor; and
   a capacitor having a first end connected to a second end of the first switch and having a second end connected to a second end of the second switch.

7. The power supply apparatus of claim 6, wherein the first switch and the second switch operate complementarily.

8. The power supply apparatus of claim 6, wherein the first switch and the second switch are implemented by an insulated gate bipolar mode transistor (IGBT).

9. The power supply apparatus of claim 6, wherein the first switch and the second switch of the power converter are pulse width modulation controlled to supply the power output from the battery to the motor via the power converter and the inverter while driving the motor.

10. The power supply apparatus of claim 1, wherein the power converter is configured to convert the power supplied from the battery to a driving power for driving the motor.

11. The power supply apparatus of claim 1, wherein the inverter is configured to convert the converted driving power to a three-phase AC power to transmit to the motor.

* * * * *